United States Patent

Chanal et al.

[11] Patent Number: 4,557,290
[45] Date of Patent: Dec. 10, 1985

[54] HYDRAULIC SLIDE CONTROL SAFETY VALVE FOR A MINE SUPPORT JACK

[75] Inventors: Roger Chanal, Saint Etienne; Daniel Cotte, Le Chambon Feugerolles, both of France

[73] Assignee: Bennes Marrel, France

[21] Appl. No.: 673,866

[22] Filed: Nov. 21, 1984

[30] Foreign Application Priority Data

Nov. 25, 1983 [FR] France .................... 83 19175

[51] Int. Cl.$^4$ .................................... F16K 31/12
[52] U.S. Cl. .................................... 137/510; 137/528; 137/529; 137/903
[58] Field of Search ............... 137/509, 510, 528, 529, 137/DIG. 4

[56] References Cited

U.S. PATENT DOCUMENTS 3,399,677  9/1968  Gould ........................... 604/99
3,662,779  5/1972  Weber ........................ 137/510 X
4,190,045  2/1980  Bartels ....................... 137/528 X

FOREIGN PATENT DOCUMENTS 1450558  5/1963  Fed. Rep. of Germany ...... 137/528
2430329  1/1975  Fed. Rep. of Germany ...... 604/99

Primary Examiner—Harold W. Weakley
Attorney, Agent, or Firm—Remy J. VanOphem

[57] ABSTRACT

A safety valve designed for relieving pressure in a mine support jack. A washer and check valve are positioned in a counterbore located on the front surface of a resilient gasket member. A leg extends from the rear surface of the resilient gasket and extends through a rear chamber to support the check valve in a position sealing the outlet port. The rear chamber is filled with pressurized gas to form a gas cushion. The end of the leg is positioned to seal an inflation orifice.

13 Claims, 3 Drawing Figures

HYDRAULIC SLIDE CONTROL SAFETY VALVE FOR A MINE SUPPORT JACK

BACKGROUND OF THE INVENTION

1. Field of the Invention

The present invention relates to a pressure relief safety valve for use on hydraulic jacks or supports in mines.

2. Description of the Prior Art

In mining operations, it is known that a hydraulic chock includes strut jacks that are wedged between the ceiling and the walls of the galleries. These jacks apply a significant pressure while sustaining the pressure applied by the adjacent beds.

The latter, however, may increase and reach practically unlimited values. It is, therefore, necessary to make provisions for a pressure relief safety valve, called "slide control valve", on the hydraulic systems of the supports.

Some slide control valves are already known, such as the one described in French Pat. No. 2 504 974 for instance. This type of slide control valve may encompass several variations by providing the slide control safety valve with different spring return means, such as a metal spring, a gas cushion, or a stacking of spring washers. The aforementioned assembly requires a relatively large valve.

The present invention eliminates these disadvantages by offering a slide control hydraulic pressure relief safety valve designed with a spring return means including a compressed gas cushion whose construction offers both a limited number of components and reduced overall dimensions.

SUMMARY OF THE INVENTION

A hydraulic safety valve as described in the present invention includes a barrel screwed on a seat. The front surface of the seat includes an inlet port and an outlet port for the pressurized fluid. A washer is provided adjacent to the seat and the washer cooperates with a check valve subjected to the pressuree of a gas cushion compressed in the rear chamber of the barrel. The hydraulic safety valve is provided with a resilient gasket member positioned between the check valve and the gas cushion. The front face of the resilient gasket member is applied against the whole surface of the check valve, whereas the rear most part of its back face is extended by a central leg resting against the bottom surface of the barrel. This rear flexible leg is preloaded during the valve assembly.

According to another feature of the present invention, the rear bearing end of the leg of the resilient gasket member rests against the bottom surface of the barrel which has, in this particular area, a gas inflation orifice. The port of the inflation orifice is covered by the bearing end of the leg.

According to a further feature of the present invention, the leg of the resilient gasket member includes an inner peripheral groove near the bearing end of the leg which rests on the bottom surface, and which increases the contact pressure of the bearing end on the bottom surface.

According to still a further feature of the present invention, the front of the resilient gasket member includes a counterbore bored in such a way as to define a flexible peripheral front skirt, allowing it to completely surround the check valve and the washer.

According to yet another feature of the present invention, the flexible peripheral skirt, protruding from the front face of the gasket, is extended by a rear peripheral skirt which extends from the rear of the resilient gasket member, so that the flexible front skirt on the front face of the gasket is facing the flexible peripheral rear skirt on the rear face of the resilient gasket member.

According to yet another feature of the present invention, after insertion of the washer, the check valve, and the resilient gasket member, the valve is assembled by screwing the barrel on the seat. Therefore, when the valve is assembled both the front and rear peripheral skirts of the resilient gasket member are axially compressed between the barrel and the seat onto which it is screwed, whereas the central rear leg of the gasket is preloaded in compression against the bottom surface of the barrel, so as to keep the check valve and its washer pressed against the seat whose outlet port is thus plugged.

According to still another feature of the present invention, the outlet port is centrally located in the seat, facing a central embossment of the check valve which blocks the outlet port when not in operation.

According to a further feature of the present invention, the check valve has the shape of a disk having a front face with a central embossment which seats in the central recess of the washer.

According to still another feature of the present invention, the washer is flat, except for a concentric circular ridge which protrudes on the front face so as to rest against the seat. Thus, the washer does not completely obstruct the inlet port in the seat through which the pressurized fluid passes.

The accompanying drawings will allow a better understanding of the objects and advantages of the present invention.

DETAILED DESCRIPTION OF THE PREFERRED EMBODIMENT

Figure 1:
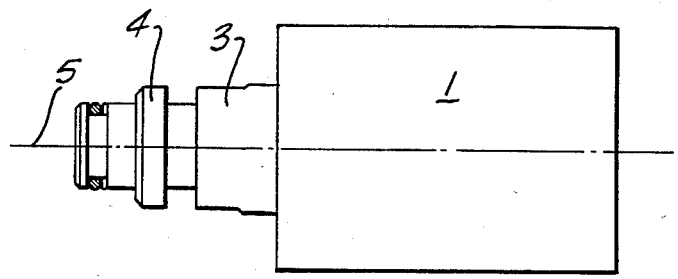
FIG. 1 is a front view of a safety valve according to the present invention.

The safety valve represented in the drawings includes a barrel 1, whose front end includes an internal thread 2 and which allows it to be screwed onto a seat 3. The seat 3 may be constructed of any suitable material.

The seat 3 includes a connector 4 designed for communication with a corresponding connector 4a for a hydraulic system, such as that of a mine support jack. The pressure thus transmitted by the jack, indicated by arrow 5, enters the system through an inlet passage 6 of the connector 4, and continues toward an inlet port 7, offset on a bearing surface 3a of the seat 3. Positioned in the center of the bearing surface 3a is an outlet port 8 which opens into an outlet passage 10 in the seat in a direction as shown by arrow 9.

The barrel 1 includes two consecutive internal shoulders. A first shoulder 11, located adjacent to the internal thread 2 is designed to abut an outer edge of the bearing surface 3a of the seat 3. A second shoulder 12, having a diameter smaller than the diameter of the first shoulder 11, is located between the first shoulder 11 and a bottom surface 13.

An inflation orifice 14, designed to accept gas under pressure as necessary to fill a rear chamber 15 of the barrel 1, is provided in the center of the bottom surface 13.

Upon assembly, a washer 16, a check valve 17, and a resilient gasket member 18 are mounted in the barrel 1 between the bottom surface 13 of the barrel 1 and the seat 3.

The washer 16 defines a central annular recess 19. The washer 16 has a generally flat face 16a. The front face 16a has a circular concentric ridge 20 which protrudes from the front face 16a so as to rest on the bearing surface 3a of the seat 3. An annular chamber 31 is defined by the bearing surface 3a of the seat, the front face 16a of the washer 16, and the circular concentric ridge 20. The circular concentric ridge 20 is positioned so that the inlet port 7 is partially blocked.

The check valve 17 is a solid flat disk 21 which includes, at its center, an embossment 22 protruding from a front surface 21a. The embossment 22 is seated in the central annular recess 19 of the washer 16 and blocks the outlet port 8 as long as the check valve 17 remains closed.

The resilient gasket member 18 is formed as one piece, from a resilient material. It has the shape of a cylindrical solid having a peripheral front skirt 23 and a peripheral rear skirt 24 aligned on either side of a diaphragm portion 25; a counterbore 26 bored on a front surface of the resilient gasket member 18 adapted to receive the check valve 17 and the washer 16 therein; a leg 27 centrally protruding on the rear surface of the diaphragm portion 25 terminating in a bearing end 29; and a peripheral groove 28 positioned near the rear of the leg 27 adjacent the bearing end 29. The bearing end 29 of the leg 27 has an elastically deformable peripheral lip surrounding a central recess 30. The central recess 30 is shaped to block the inflation orifice 14. After assembly, the diaphragm portion 25 is preloaded in a direction away from the bottom surface 13 by reaction to the pressure of the leg 27 against the bottom surface 13.

The assembly operates as follows.

Figure 2:
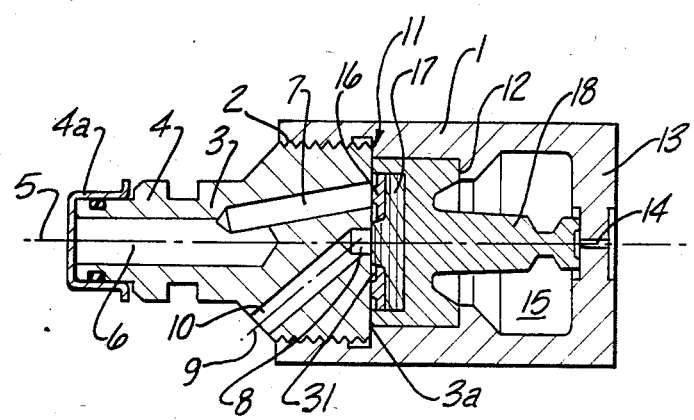
FIG. 2 is a longitudinal sectional view showing the assembled valve in a neutral position.
Figure 3:
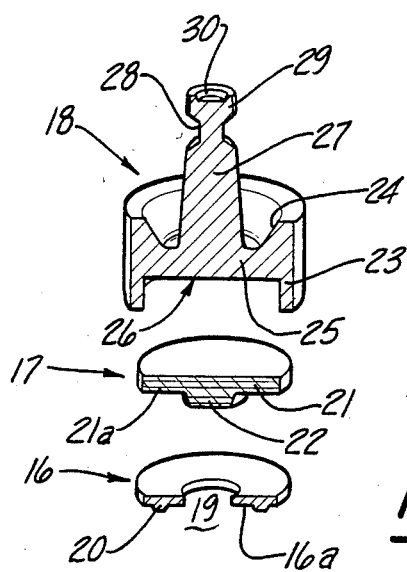
FIG. 3 is an exploded perspective sectional view showing the detail of the mobile valve components.

In neutral, the safety valve is positioned as illustrated in FIG. 2. The safety valve is activated by inflation of the gas cushion defined by the rear chamber 15, this being achieved by injecting a predetermined pressurized gas into the rear chamber 15 through the inflation orifice 14. In the course of this operation, the force of the pressurized gas elastically deforms the peripheral lip of the bearing end 29, in order to permit the pressurized gas to enter the rear chamber 15.

The safety valve is then ready for operation. The check valve 17 and the washer 16 are preloaded to push against the seat 3 by the leg 27. The peripheral front skirt 23 and the peripheral rear skirt 24 are also subjected to a preload, between the seat 3 and the second shoulder 12.

After mounting of the safety valve on a mine support, the inlet feed pressure, indicated by arrow 5, is applied to the annular chamber 31. As long as this pressure is less than a predetermined value, the thrust simultaneously applied by the preload of the leg 27 and by the gas cushion of the rear chamber 15 maintains the seal of the embossment 22 against the outlet port 8 which, thus, remains blocked.

As soon as the inlet feed pressure, indicated by arrow 5, exceeds the predetermined value, the check valve 17 opens and a quantity of pressurized liquid is drained off through the outlet passage 10, which immediately causes the inlet feed pressure indicated by arrow 5 to decrease. The quantity of pressurized liquid which is drained off through the outlet passage 10 is usually small.

During the opening and closing phases of the check valve 17, the displacements of the check valve 17 are accompanied by an equivalent distortion of the resilient gasket member 18, so that there is no interference with the displacement of the check valve 17.

The resilient gasket member 18 is interposed the check valve 17 and the rear chamber 15 so that, if the check valve 17 were to deteriorate, the pressurized liquid would not enter the rear chamber 15, thereby preventing a hydraulic locking of the mine prop, as the case would be if the pressurized liquid, indicated by the arrow 5, did enter the rear chamber 15 of the gas cushion.

The presence of the peripheral groove 28 allows the pressure of the gas cushion present in the rear chamber 15 to increase the contact pressure of the bearing end 29 against the bottom surface 13, thereby securing the sealing of the inflation orifice 14.

The specific profile of the resilient gasket member 18 called for in the present invention is especially designed to simultaneously perform four functions that are essential to the proper operation of the safety valve, namely: the inflation of the rear chamber 15 with a pressurized gas; the complete sealing of the gas cushion defined in the rear chamber 15; the total impermeability to all of the fluids present in the annular chamber 31; and the free opening or closing of the check valve 17.

What is claimed is:

1. A safety valve for a hydraulic device comprising:
a barrel having an open end and a bottom surface enclosing a second end;
a seat demountably affixed in said open end of said barrel, said seat having a bearing surface defining a rear chamber in said barrel;
a resilient gasket member positioned in said rear chamber of said barrel, said resilient gasket member having a counterbore adjacent said bearing surface and a leg compressably positioned on said bottom surface of said barrel, said leg preloading said resilient gasket member in a direction away from said bottom surface of said barrel;
an inflation orifice positioned in said bottom surface of said barrel, said inflation orifice for delivery of pressurized gas into said rear chamber of said barrel whereby said resilient gasket member is pressed by said pressurized gas in a direction away from said bottom surface of said barrel;
an inlet passage located in said seat for delivery of hydraulic fluid from said hydraulic device into said counterbore of said resilient gasket member;
an outlet passage located in said seat for delivering hydraulic fluid from said counterbore of said resilient gasket member to a location external of said safety valve; and
means for selectively passing hydraulic fluid from said inlet passage to said outlet passage, said means for selectively passing positioned in said counterbore of said resilient gasket member, said means for selectively passing positioned in said counterbore of said resilient gasket member operable for passing hydraulic fluid when hydraulic fluid of a predetermined pressure is in said inlet passage.

2. The safety valve as claimed in claim 1 wherein said means for selectively passing further comprises:

a washer positioned in said counterbore of said resilient gasket member adjacent said bearing surface of said seat, said washer having an annular recess and a check valve positioned in said counterbore of said resilient gasket member for selective transverse movement, said check valve selectively movable to pass hydraulic fluid from said inlet passage to said outlet passage at a predetermined value of pressure of hydraulic fluid in said inlet passage.

3. The safety valve as claimed in claim 1 wherein said leg of said resilient gasket member abuts said inflation orifice for sealing said inflation orifice.

4. The safety valve as claimed in claim 3 wherein said leg of said resilient gasket member further comprises a peripheral groove positioned on said leg of said resilient gasket member for increasing the sealing pressure of said leg of said resilient gasket member applied to said inflation orifice.

5. The safety valve as claimed in claim 1 wherein said resilient gasket member further comprises a peripheral front skirt surrounding said counterbore of said resilient gasket member, said peripheral front skirt provided for sealingly positioning said means for selectively passing hydraulic fluid.

6. The safety valve as claimed in claim 1 wherein said barrel further comprises a first shoulder and a second shoulder, said first shoulder positioned adjacent said bearing surface of said seat, said second shoulder interposed said first shoulder of said barrel and said bottom surface of said barrel.

7. The safety valve as claimed in claim 6 wherein said resilient gasket member further comprises a peripheral rear skirt abutting said second shoulder of said barrel, said peripheral rear skirt of said resilient gasket member sealing said rear chamber of said barrel.

8. The safety valve as claimed in claim 2 wherein said check valve further comprises a solid flat disk having an embossment, said embossment of said check valve positioned on said disk for mating with said central annular recess of said washer.

9. The safety valve as claimed in claim 8 wherein said outlet passage is positioned on said bearing surface of said seat adjacent said central annular recess of said washer, said embossment of said check valve blocking said outlet passage.

10. The safety valve as claimed in claim 2 wherein said washer further comprises a front face and a circular concentric ridge, said circular concentric ridge being positioned on said front face of said washer such that said circular concentric ridge abuts said bearing surface of said seat, said circular concentric ridge further defining an annular chamber for receiving hydraulic fluid from said inlet passage.

11. The safety valve as claimed in claim 10 wherein said circular concentric ridge is positioned on said front face of said washer for partially blocking said inlet passage.

12. The safety valve as claimed in claim 1 wherein said leg of said resilient gasket member further comprises a bearing end abutting said bottom surface of said barrel, said bearing end having a central recess adjacent said inflation orifice for sealing said inflation orifice.

13. The safety valve as claimed in claim 1 wherein said means for selectively passing hydraulic fluid is operable for passing hydraulic fluid at a predetermined value of pressure greater than the combined pressure of said pressurized gas in said rear chamber and the preloading of said resilient gasket member by said leg.

* * * * *

UNITED STATES PATENT AND TRADEMARK OFFICE
CERTIFICATE OF CORRECTION

PATENT NO. : 4,557,290
DATED : December 10, 1985
INVENTOR(S) : Roger Chanal & Daniel Cotte It is certified that error appears in the above-identified patent and that said Letters Patent is hereby corrected as shown below:

Column 1, Line 44, delete "pressuree" and insert ---- pressure ----.

Signed and Sealed this

Twenty-ninth Day of April 1986

[SEAL]

Attest:

DONALD J. QUIGG

Attesting Officer

Commissioner of Patents and Trademarks